(12) United States Patent
Ichiza et al.

(10) Patent No.: US 11,777,182 B2
(45) Date of Patent: Oct. 3, 2023

(54) POWER SUPPLY DEVICE

(71) Applicant: SANYO Electric Co., Ltd., Osaka (JP)

(72) Inventors: Tomoyuki Ichiza, Nara (JP); Osamu Ohashi, Osaka (JP)

(73) Assignee: PANASONIC ENERGY CO., LTD., Moriguchi (JP)

( * ) Notice: Subject to any disclaimer, the term of this patent is extended or adjusted under 35 U.S.C. 154(b) by 133 days.

(21) Appl. No.: 17/429,328

(22) PCT Filed: Feb. 7, 2020

(86) PCT No.: PCT/JP2020/004772
§ 371 (c)(1),
(2) Date: Aug. 6, 2021

(87) PCT Pub. No.: WO2020/175099
PCT Pub. Date: Sep. 3, 2020

(65) Prior Publication Data
US 2022/0149493 A1 May 12, 2022

(30) Foreign Application Priority Data
Feb. 26, 2019 (JP) ................................. 2019-033003

(51) Int. Cl.
| | |
|---|---|
| *H01M 50/581* | (2021.01) |
| *H01M 50/204* | (2021.01) |
| *H01M 50/51* | (2021.01) |
| *H01M 50/583* | (2021.01) |
| *H02H 7/18* | (2006.01) |
| *H01H 85/0445* | (2006.01) |

(52) U.S. Cl.
CPC ....... *H01M 50/581* (2021.01); *H01M 50/204* (2021.01); *H01M 50/51* (2021.01); *H01M 50/583* (2021.01); *H02H 7/18* (2013.01); *H01M 2200/103* (2013.01)

(58) Field of Classification Search
CPC .. H01M 50/581; H01M 50/204; H01M 50/51; H01M 50/583; H01M 2200/103; H02H 7/18; H01H 85/0445; Y02E 60/10
See application file for complete search history.

(56) References Cited

U.S. PATENT DOCUMENTS

2012/0126929 A1   5/2012  Tong et al.
2013/0260191 A1* 10/2013  Takahashi ......... H01M 10/4257
                                                   429/61

FOREIGN PATENT DOCUMENTS

| CN | 202103399 U | 1/2012 |
| CN | 205724997 U | 11/2016 |
| CN | 206595360 U | 10/2017 |
| JP | 2001-352666 | 12/2001 |
| JP | 2001352666  | * 12/2001 |

(Continued)

OTHER PUBLICATIONS

The Extended European Search Report dated Mar. 21, 2022, issued in counterpart EP Application No. 20762167.3. (6 pages).

(Continued)

*Primary Examiner* — Lisa S Park
(74) *Attorney, Agent, or Firm* — WHDA, LLP

(57) ABSTRACT

In a power supply device, a plurality of battery modules are connected in series, the plurality of battery modules including fuse connected in series with battery. In the power supply device, fuse included in the plurality of battery modules is fast-blow fuse.

3 Claims, 2 Drawing Sheets

(56) References Cited

FOREIGN PATENT DOCUMENTS

| JP | 2002-095157 | 3/2002 |
| JP | 2012-527716 | 11/2012 |
| JP | 2013-206642 | 10/2013 |
| WO | 2010/133176 | 11/2010 |

OTHER PUBLICATIONS

International Search Report of PCT application No. PCT/JP2020/004772 dated Apr. 21, 2020.

\* cited by examiner

POWER SUPPLY DEVICE

CROSS-REFERENCE TO RELATED APPLICATIONS

This application is a U.S. national stage application of the PCT International Application No. PCT/JP2020/004772 filed on Feb. 7, 2020, which claims the benefit of foreign priority of Japanese patent application No. 2019-033003 filed on Feb. 26, 2019, the contents all of which are incorporated herein by reference.

TECHNICAL FIELD

The present invention relates to a power supply device in which a plurality of battery modules are connected in series, the plurality of battery modules including a fuse.

BACKGROUND ART

In a large-output power supply device, a plurality of battery modules are connected in series to increase an output voltage. In this type of power supply device, a fuse as a protection element is provided in a battery module in order to prevent an adverse effect due to an excessive electric current such as a short-circuit current. In the power supply device in which a plurality of battery modules are connected in series to increase the total voltage, it is necessary to use a fuse having a withstand voltage higher than the total voltage of the entire device for the fuse of each battery module. This is because when an excessive electric current flows due to an external short circuit or the like and a fuse of any battery module is blown, a high voltage exceeding the total voltage is applied to the fuse that has been blown. At a fuse that interrupts a large electric current, an extremely high voltage is generated while the fuse is being blown to consume energy stored in an inductance of a load. The energy stored in the inductance increases in proportion to the product of the square of the electric current and the inductance. Hence, when a large electric current is interrupted, a high voltage is generated in the fuse that has been blown to consume large energy. In particular, the energy stored in the load at the time of blowing increases in proportion to the square of the electric current. Hence, even with a small inductance of the load, the induction voltage increases, when a large electric current is interrupted. Regarding the load inductance of the power supply device, not only the inductance of the load itself but also the inductance of a line is added. Thus, even with the small inductance of the load, the induction voltage is generated by the inductance of the line, when the large electric current is interrupted. When the voltage induced to the fuse that has been blown exceeds the withstand voltage of the fuse, there is an adverse effect that an arc is generated in the fuse that has been blown and ignition or the like may occur. Fuses having high rated voltages are large in size and are high in component cost, so a power supply device including a fuse having a high rated voltage for each battery module has drawbacks that the entire power supply device is large and expensive.

In order to address such drawbacks, there has been developed a power supply device in which battery modules are connected in series via a fuse, and in addition, a fuse having a high withstand voltage is used for such a fuse. (See PTL 1)

CITATION LIST

Patent Literature

PTL 1: Unexamined Japanese Patent Publication No. 2013-206642

SUMMARY OF THE INVENTION

As illustrated in FIG. 2, in the power supply device of PTL 1, it is not necessary to use a fuse having a high rated voltage for fuse 92 of battery module 90, but it is necessary to use fuse 93 having a high withstand voltage to connect battery modules 90 in series. Fuse 93 having a high withstand voltage is higher in component cost than fuse 92 of battery module 90. Accordingly, in such a power supply device, it is necessary to use additional fuses each having a high component cost, and thus the manufacturing cost increases.

Furthermore, in such a power supply device, it is necessary to blow fuse 93 having a high withstand voltage without blowing fuse 92 of battery module 90. Accordingly, fuse 93 having a high withstand voltage is demanded to have a characteristic of blowing before battery module 90 blows. In a case where fuse 92 of battery module 90 is blown earlier than fuse 93 having a high withstand voltage, an arc is generated in blown fuse 92 having a low withstand voltage, and an adverse effect such as ignition occurs. In order to blow earlier fuse 93 having a high withstand voltage for connecting the battery modules 90 in series, in the power supply device of FIG. 2, the electric current by which fuse 93 having a high withstand voltage is blown is made smaller than that of fuse 92 of battery module 90 so as to blow fuse 93 earlier than fuse 92 of battery module 90.

In a power supply device in which there is a small difference in fusing characteristic between the fuse having a high withstand voltage and the fuse of the battery module that are to be selected, the fuse having a high withstand voltage does not always blow earlier than the fuse of the battery module. Therefore, in order to reliably blow the fuse having a high withstand voltage earlier than the fuse of the battery module, it is necessary to increase the difference in fusing characteristic between the fuse having a high withstand voltage and the fuse of the battery module. In such a power supply device, it is necessary to set the fusing characteristic of the fuse having a high withstand voltage considerably faster than the fuse of the battery module, in other words, it is necessary to set the fusing characteristic of the fuse of the battery module considerably slower than the fuse having a high withstand voltage. The fuse of the battery module serves as a protection element of the battery module, and protects the battery module from an external short circuit, and the fuse having a high withstand voltage for connecting the battery modules in series protects the power supply device from an external short circuit. In consideration of the protection, it is ideal to make the fusing characteristic of the fuse having a high withstand voltage faster than that of the fuse of the battery module. However, in a case where the fusing characteristic of the fuse of the battery module is set to be slow in order to blow the fuse having a high withstand voltage earlier, the blowing timing deviates, and a high voltage is applied to the fuse that has blown earlier. It is difficult to blow the fuse immediately due to an external short circuit of the battery module, so it is difficult to use the fuse of the battery module as a protection element that ensures high safety.

The present invention has been developed for the purpose of solving the problems in the conventional power supply device as described above, and an object of the present invention is to provide a power supply device in which a battery module is protected in an ideal state to ensure high safety with a component cost reduced.

A power supply device according to an aspect of the present invention is a power supply device in which a plurality of battery modules are connected in series, the plurality of battery modules including a fuse connected in series with a battery, and the fuse included in the plurality of battery modules is a fast-blow fuse.

In the power supply device in the present invention, there is a characteristic that high safety can be ensured by protecting the battery module in an ideal state with the component cost reduced.

DESCRIPTION OF EMBODIMENT

Figure 1:
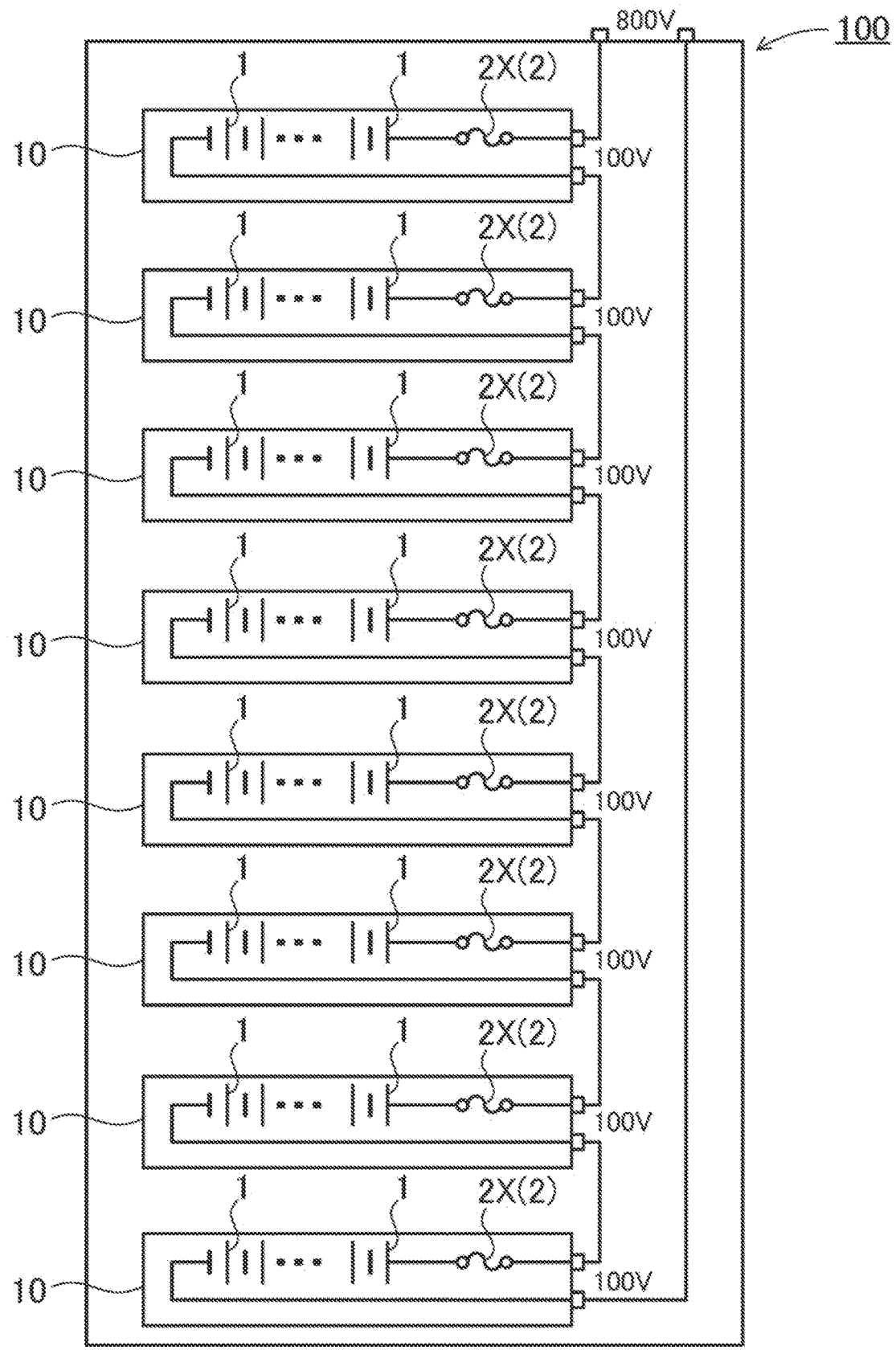
FIG. 1 is a schematic configuration diagram of a power supply device according to an exemplary embodiment of the present invention.
Figure 2:
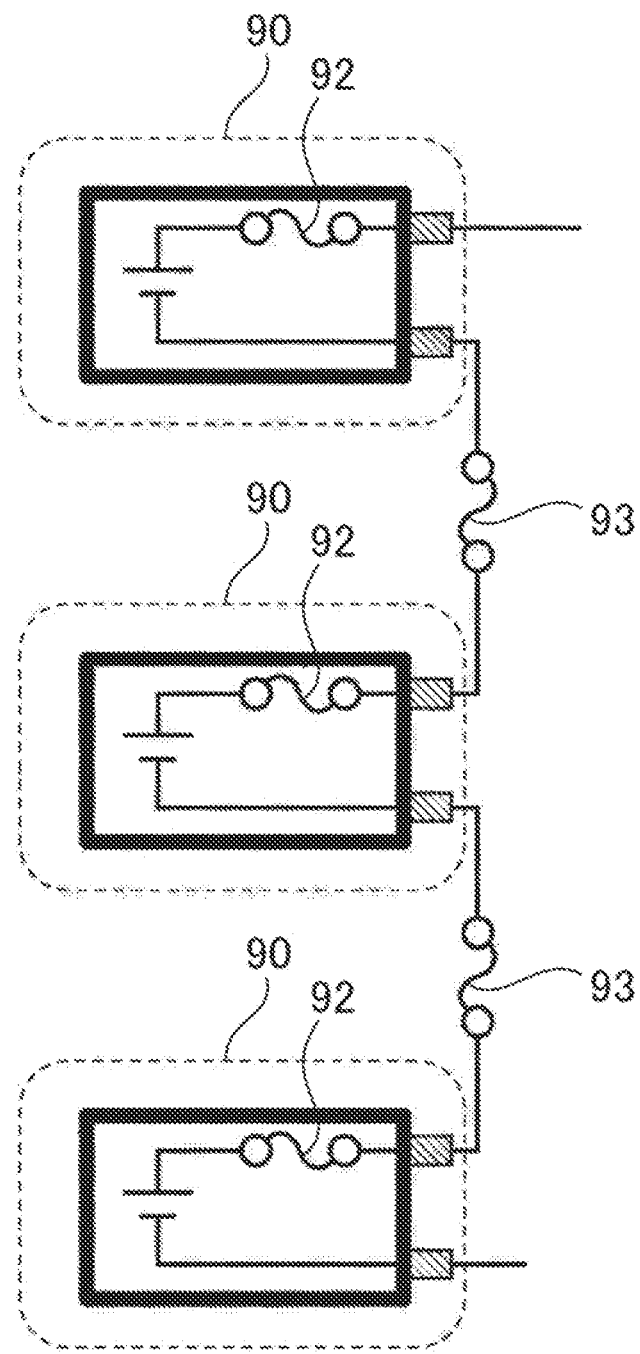
FIG. 2 is a schematic configuration diagram of a conventional power supply device.

Hereinafter, the present invention will be described in detail with reference to the drawings. Note that in the following description, terms indicating specific directions or positions (for example, "upper", "lower", and other terms including those terms) are used as necessary, but these terms are used to facilitate understanding of the invention with reference to the drawings, and the technical scope of the present invention is not limited by the meanings of those terms. In addition, parts denoted by the same marks represented in a plurality of drawings indicate the same or equivalent parts or members.

Further, exemplary embodiment to be described below illustrates specific examples of the technical idea of the present invention, and the present invention is not limited to the following description. Further, the scope of the present invention is not intended to be limited to only dimensions, materials, shapes, relative arrangements, and the like of the component parts to be described below, unless otherwise specified, and is intended to be illustrative. Further, contents described in one exemplary embodiment or example are also applicable to another exemplary embodiment or example. Further, sizes, positional relationships, and the like of members illustrated in the drawings may be exaggerated to clarify the description.

A power supply device according to a first aspect of the present invention is a power supply device in which a plurality of battery modules are connected in series, the plurality of battery modules including a fuse connected in series with a battery, and the fuse included in the plurality of battery modules is a fast-blow fuse.

In the above-described power supply device, the fast-blow fuse is used for the fuse of the battery module. Thus, when an external short circuit of the power supply device occurs and an excessive electric current flows, the fast-blow fuse of each battery module is blown. The fast-blow fuse has a short blowing time, and is blown in an extremely short period of time. Therefore, when a large short-circuit current flows due to an external short circuit or the like of the power supply device, an excessive electric current flows through the fuse of each battery module and heat is generated by Joule heat, the temperature rises, and the fuse is blown instantaneously. In the power supply device in which the fuses of the plurality of battery modules are blown by a large electric current such as an external short circuit, a high voltage generated at the time of electric current interruption is divided and induced in the fuses that have been blown of the plurality of battery modules. Therefore, in the power supply device described above, unlike the conventional device, a high voltage is not induced to the fuse that has been blown after only the fuse of one battery module is blown. The plurality of fuses are blown, and the voltage is divided and induced to the fuses that have been blown. Therefore, it is possible to prevent an adverse effect of generating sparks due to, for example, arc discharge caused by induction of a high voltage into the fuse that has been blown.

Further, in the power supply device described above, unlike the power supply device illustrated in conventional PTL 1, the generation of sparks or the like due to arc discharge of the fuse that has been blown can be prevented without connecting the battery modules in series by a high-voltage fuse. Thus, there is a characteristic that adverse effects due to the arc discharge can be prevented without using an expensive fuse having a high withstand voltage, that is, with the component cost reduced.

Furthermore, the power supply device described above eliminates the need for providing a fuse in the battery module and further connecting the battery modules in series with a fuse having a high withstand voltage like the device of PTL 1. Thus, there is a characteristic that a fusing current of the fuse of the battery module can be set to a set electric current with which the fuse can be reliably blown by an external short circuit of the battery module, and the entirety of the power supply device can be protected safely from an excessive electric current such as an external short circuit, while a single battery module is protected safely from the external short circuit.

In the power supply device according to a second aspect of the present invention, a rated voltage of a fast-blow fuse is higher than an output voltage of each of the plurality of battery modules, and is lower than a total voltage obtained by connecting the plurality of battery modules in series.

In the power supply device according to a third aspect of the present invention, the fuses of all battery modules are fast-blow fuses.

In the power supply device described above, there is a characteristic that the fuses of all the battery modules can be blown by an excessive electric current such as an external short circuit, so the voltage applied to each fuse can be extremely lowered in a state where the fuse is blown.

In the power supply device according to a fourth aspect of the present invention, fuses of at least two sets of the battery modules are fast-blow fuses.

In the power supply device described above, the fuses of the plurality of battery modules can be simultaneously blown by an excessive electric current such as an external short circuit, so an excessive voltage can be prevented from being applied to a single fuse after having been blown. For example, by using the fast-blow fuses for the fuses of three sets of the battery modules, the total voltage is applied from the fuse on the top to an end of the fuse on the bottom that have been simultaneously blown. The withstand voltage of the three sets of fuses connected in series has a withstand voltage capability of the sum of the three sets, so adverse effects caused by the arc discharge or the like can be prevented. Regarding such a power supply device, in a device capable of preventing the arc discharge with a number of fuses that have been blown, there is a characteristic that a number of fast-blow fuses is reduced, and the component cost can be further reduced as compared with the device in which the fuses of all the battery modules are the fast-blow fuses.

First Exemplary Embodiment

In power supply device 100 illustrated in the block diagram of FIG. 1, a plurality of battery modules 10 are connected in series. In battery module 10, a plurality of batteries 1 are connected in series, and fuse 2 as a protection element is connected in series with batteries 1. In power supply device 100, the plurality of battery modules 10 are connected in series to increase the total voltage. The total voltage of power supply device 100 corresponds to a voltage obtained by adding output voltages of respective battery modules 10. Therefore, in power supply device 100, a number of battery modules 10 connected in series is adjusted so as to obtain an output voltage suitable for a use application. For example, n battery modules 10 are connected in series, so that the total voltage can be n times the voltage of battery module 10.

The output voltage of battery module 10 can also be specified by the number of batteries 1 connected in series. Therefore, in power supply device 100, for example, 27 lithium-ion secondary batteries each having a rated voltage 3.7 V are connected in series, so that the output voltage of battery module 10 can be set to approximately 100 V, and eight battery modules 10 are connected in series, so that the total voltage can be set to 800 V.

In power supply device 100 in which the plurality of battery modules 10 are connected in series, when an excessive short-circuit current flows due to an external short circuit or the like, fuse 2 of battery module 10 is blown. In this state, when only fuse 2 of any one of battery modules 10 is blown and fuses 2 of other battery modules 10 are not blown, a considerably high voltage exceeding the total voltage is induced to fuse 2 that has been blown. The induced voltage generated when fuse 2 is blown increases in proportion to the energy of the electric current stored in the inductance of a load connected with power supply device 100. The energy of the electric current stored in the inductance increases in proportion to the product of the square of the electric current to be interrupted and the inductance. Power supply device 100 having a high output voltage is used for a large-output use application. Accordingly, an electric current flowing when fuse 2 is interrupted is large. In particular, a short-circuit current flowing due to an external short circuit is extremely large, and the energy of the inductance is also considerably large. For this reason, in power supply device 100 in which a large number of battery modules 10 are connected in series, when one fuse 2 is blown, a considerably high voltage is induced in one fuse 2. A high induction voltage leads to arc discharge at fuse 2 that has been blown, and causes sparks or the like.

Battery module 10 is capable of eliminating by using a fuse having a withstand voltage higher than an induced voltage generated in the fuse that has been blown by an excessive electric current. However, in power supply device 100 in which the plurality of battery modules 10 are connected in series, the voltage to be induced when one fuse 2 is blown may become extremely high, which is sometimes as high as several times the total voltage. Therefore, for example, in power supply device 100 of a high voltage having the total voltage 800 V, an induced voltage generated at the time of blowing the fuse may be a high voltage exceeding 1000 V. Hence, it is necessary to use a fuse having an extremely high withstand voltage. The fuse having a high withstand voltage is large in size and high in component cost, and thus has a disadvantage that the device becomes large and the cost increases.

In power supply device 100 in the first exemplary embodiment of the present invention, in order to prevent the above-described adverse effects, the fuses included in all battery modules 10 connected in series are fast-blow fuses 2X. For example, in fast-blow fuses 2X, a blowing time in a state where an electric current of 10 times the rated current flows through fast-blow fuse 2X is set to less than or equal to 30 msec, preferably less than or equal to 20 msec. Such fuses 2 are blown in only less than or equal to $2/100$ seconds to $3/100$ seconds, after an electric current of 10 times the rated current flows through. Thus, a time width in which an excessive short-circuit current flows through and the fuse blows is extremely narrow, and the fuse is blown almost instantaneously. In addition, regarding the structure of the fast-blow fuse, the structure includes an arc-extinguishing material, and a narrow portion in a fusible body. Therefore, fast-blow fuse 2X provided in each battery module 10 is instantaneously blown. In power supply device 100, fuses 2 of all battery modules 10 are preferably fast-blow fuses 2X. In power supply device 100, when a large short-circuit current flows due to an external short circuit or the like, fuses 2 of all battery modules 10 are blown. Power supply device 100 in which fuses 2 of all battery modules 10 are blown is capable of receiving a total voltage between the top and the bottom of fuses 2 each being connected in series. Therefore, in power supply device 100 in which the rated voltage of fuse 2 of battery module 10 withstands the output voltage of battery module 10, for example, the output voltage of battery module 10 is set to 100 V, it is possible to use fast-blow fuse 2X, the rated voltage of which is set to a voltage that withstands an induced voltage generated by blowing battery module 10 of 100 V, for example, the rated voltage of fast-blow fuse 2X is set to 250 V.

The power supply device does not necessarily have to include a fuse in all the battery modules for an external short circuit. For example, in a power supply device in which eight battery modules 10 each having an output voltage 100 V are connected in series, the fuses of four battery modules can be the fast-blow fuses each having a rated voltage 250 V without the provision of fuses in the remaining battery modules. In such a power supply device, four fast-blow fuses are blown by a short-circuit current such as an external short circuit, and 800 V is applied from the top to the bottom of the four fuses. However, adverse effects due to arc discharge or the like can be prevented by the withstand voltage capabilities of the four fuses each having a withstand voltage 250 V.

INDUSTRIAL APPLICABILITY

The present invention can be suitably used as a power supply device capable of ensuring high safety in a power supply device formed by connecting a plurality of battery modules in series.

REFERENCE MARKS IN THE DRAWINGS 100 power supply device
1 battery
2 fuse
2X fast-blow fuse
10 battery module
90 battery module

92 fuse
93 fuse having a high withstand voltage

The invention claimed is:

1. A power supply device comprising
a plurality of battery modules are connected in series, the plurality of battery modules including a battery and a fuse connected in series with the battery, wherein
the fuse included in at least one of the plurality of battery modules is a fast-blow fuse,
wherein a rated voltage of the fast-blow fuse is higher than an output voltage of each of the plurality of battery modules, and is lower than a total voltage obtained by connecting the plurality of battery modules in series,
wherein the blowing time of the fast-acting fuse is 30 msec or less in a state in which a current is ten times the rated flow current.

2. The power supply device according to claim 1, wherein the fuse of each of the plurality of battery modules is a fast-blow fuse.

3. The power supply device according to claim 1, wherein the fuse of each of at least two sets of the plurality of battery modules is a fast-blow fuse.

* * * * *